US011949157B2

(12) United States Patent
Hsu et al.

(10) Patent No.: US 11,949,157 B2
(45) Date of Patent: Apr. 2, 2024

(54) DUAL POLARIZATION LOG-PERIODIC ANTENNA APPARATUS

(71) Applicants: GRAND-TEK TECHNOLOGY CO., LTD., New Taipei (TW); RESILIENT TECHNOLOGY CO., LTD., New Taipei (TW)

(72) Inventors: Kai-Hsiung Hsu, New Taipei (TW); Jia-Jiu Song, New Taipei (TW); Chien-Wen Hung, New Taipei (TW)

(73) Assignees: GRAND-TEK TECHNOLOGY CO., LTD., New Taipei (TW); RESILIENT TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/939,943

(22) Filed: Sep. 7, 2022

(65) Prior Publication Data

US 2024/0079788 A1 Mar. 7, 2024

(51) Int. Cl.
*H01Q 11/10* (2006.01)
*H01Q 1/36* (2006.01)

(52) U.S. Cl.
CPC ............... *H01Q 11/10* (2013.01); *H01Q 1/36* (2013.01)

(58) Field of Classification Search
CPC ...... H01Q 11/10; H01Q 19/10; H01Q 19/102; H01Q 1/36; H01Q 19/104
See application file for complete search history.

(56) References Cited

U.S. PATENT DOCUMENTS

| | | | | |
|---|---|---|---|---|
| 3,193,831 | A * | 7/1965 | Yang | H01Q 11/105 343/840 |
| 4,198,639 | A * | 4/1980 | Killion | H01Q 15/22 343/872 |
| 4,982,197 | A * | 1/1991 | Villaseca | H01Q 25/02 343/878 |
| 6,844,862 | B1 * | 1/2005 | Cencich | H01Q 13/00 343/781 R |
| 7,907,098 | B1 * | 3/2011 | West | H01Q 9/0442 343/745 |

OTHER PUBLICATIONS

Office Action dated Jun. 14, 2023 of the corresponding Taiwan patent application No. 111123213.

* cited by examiner

*Primary Examiner* — Thai Pham
(74) *Attorney, Agent, or Firm* — Chun-Ming Shih; HDLS IPR SERVICES

(57) ABSTRACT

A dual polarization log-periodic antenna apparatus includes a log-periodic antenna and a conical reflector. The conical reflector is arranged below the log-periodic antenna. The log-periodic antenna is configured to transmit a plurality of radio waves. The conical reflector is configured to reflect the radio waves transmitted by the log-periodic antenna.

9 Claims, 10 Drawing Sheets

DUAL POLARIZATION LOG-PERIODIC ANTENNA APPARATUS

BACKGROUND OF THE DISCLOSURE

Technical Field

The present disclosure relates to an antenna apparatus, and especially relates to a dual polarization log-periodic antenna apparatus.

Description of Related Art

The dual polarization log-periodic antenna is a frequency invariant antenna while its electrical characteristics such as the impedance, the radiation pattern, the gain and the standing wave ratio, and so on, will change periodically with the logarithm of the frequency, and basically remain unchanged in a wide frequency band. The application range of the dual polarization log-periodic antenna is very wide, so that the dual polarization log-periodic antenna is very important.

However, currently the dual polarization log-periodic antenna cannot effectively concentrate the transmitted radio waves at high frequencies, so that currently the dual polarization log-periodic antenna still has defects as a directional antenna.

SUMMARY OF THE DISCLOSURE

In order to solve the above-mentioned problems, an object of the present disclosure is to provide a dual polarization log-periodic antenna apparatus.

In order to achieve the object of the present disclosure mentioned above, the dual polarization log-periodic antenna apparatus of the present disclosure includes a log-periodic antenna and a conical reflector. The conical reflector is arranged below the log-periodic antenna. Moreover, the log-periodic antenna is configured to transmit a plurality of radio waves. The conical reflector is configured to reflect the radio waves transmitted by the log-periodic antenna.

Moreover, in an embodiment of the dual polarization log-periodic antenna apparatus of the present disclosure mentioned above, the conical reflector is, for example but not limited to, a circular truncated cone.

Moreover, in an embodiment of the dual polarization log-periodic antenna apparatus of the present disclosure mentioned above, the conical reflector is, for example but not limited to, a circular cone.

Moreover, in an embodiment of the dual polarization log-periodic antenna apparatus of the present disclosure mentioned above, the conical reflector is made of a metal.

Moreover, in an embodiment of the dual polarization log-periodic antenna apparatus of the present disclosure mentioned above, the metal is, for example but not limited to, an aluminum.

Moreover, in an embodiment of the dual polarization log-periodic antenna apparatus of the present disclosure mentioned above, the log-periodic antenna includes a printed circuit board, a first planar log-periodic antenna structure, a second planar log-periodic antenna structure, a third planar log-periodic antenna structure and a fourth planar log-periodic antenna structure. The conical reflector is arranged below the printed circuit board. The first planar log-periodic antenna structure is formed on the printed circuit board. The second planar log-periodic antenna structure is formed on the printed circuit board. The third planar log-periodic antenna structure is formed on the printed circuit board and electrically connected to the first planar log-periodic antenna structure. The fourth planar log-periodic antenna structure is formed on the printed circuit board and electrically connected to the second planar log-periodic antenna structure.

Moreover, in an embodiment of the dual polarization log-periodic antenna apparatus of the present disclosure mentioned above, the dual polarization log-periodic antenna apparatus further includes a plurality of first support columns and a plurality of second support columns. The first support columns are connected to the printed circuit board. The second support columns are connected to the conical reflector.

Moreover, in an embodiment of the dual polarization log-periodic antenna apparatus of the present disclosure mentioned above, the dual polarization log-periodic antenna apparatus further includes a metal reflection plate. The metal reflection plate is connected to the first support columns and the second support columns. The metal reflection plate is arranged below the conical reflector. The conical reflector is arranged between the printed circuit board and the metal reflection plate.

Moreover, in an embodiment of the dual polarization log-periodic antenna apparatus of the present disclosure mentioned above, the dual polarization log-periodic antenna apparatus further includes a lower housing and an upper housing. The metal reflection plate is arranged on the lower housing. The upper housing is assembled to the lower housing to accommodate the log-periodic antenna, the conical reflector, the first support columns, the second support columns and the metal reflection plate.

Moreover, in an embodiment of the dual polarization log-periodic antenna apparatus of the present disclosure mentioned above, the dual polarization log-periodic antenna apparatus is applied to a host. The dual polarization log-periodic antenna apparatus further includes a plurality of coaxial cables electrically connected to the log-periodic antenna and the host.

The advantage of the present disclosure is to change the radiation direction of the dual polarization log-periodic antenna through the conical reflector.

Please refer to the detailed descriptions and figures of the present disclosure mentioned below for further understanding the technology, method and effect of the present disclosure achieving the predetermined purposes. It believes that the purposes, characteristic and features of the present disclosure can be understood deeply and specifically. However, the figures are only for references and descriptions, but the present disclosure is not limited by the figures.

DETAILED DESCRIPTION

Figure 5:
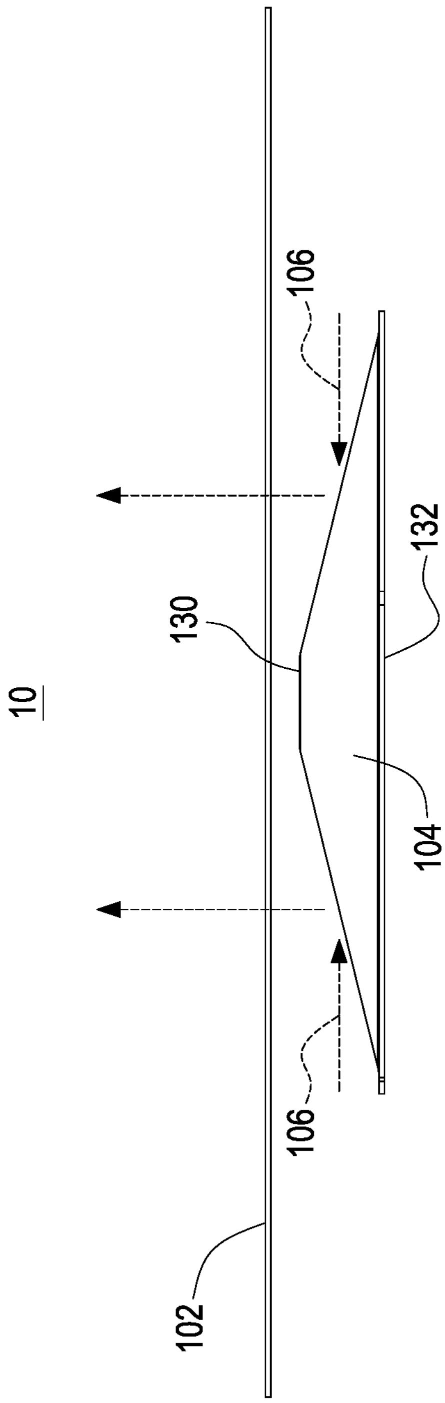
FIG. 5 shows a schematic side cross-sectional view of the embodiment of the dual polarization log-periodic antenna apparatus of the present disclosure.

In the present disclosure, numerous specific details are provided, to provide a thorough understanding of embodiments of the disclosure. Persons of ordinary skill in the art will recognize, however, that the present disclosure can be practiced without one or more of the specific details. In other instances, well-known details are not shown or described to avoid obscuring aspects of the present disclosure. Now please refer to the figures for the explanation of the technical content and the detailed description of the present disclosure:

FIG. 5 shows a schematic side cross-sectional view of the embodiment of the dual polarization log-periodic antenna apparatus 10 of the present disclosure. The purpose of FIG. 5 is to briefly describe the working principle of the dual polarization log-periodic antenna apparatus 10 of the present disclosure. As shown in FIG. 5, a dual polarization log-periodic antenna apparatus 10 of the present disclosure includes a log-periodic antenna 102 and a conical reflector 104. The conical reflector 104 is arranged below the log-periodic antenna 102. The log-periodic antenna 102 is configured to transmit a plurality of radio waves 106. The conical reflector 104 is configured to reflect the radio waves 106 transmitted by the log-periodic antenna 102.

Moreover, basically the log-periodic antenna 102 transmits the radio waves 106 upwards and downwards simultaneously, but because the purpose of FIG. 5 is to briefly describe the working principle of the dual polarization log-periodic antenna apparatus 10 of the present disclosure, FIG. does not show all the radio waves 106 transmitted outward by the log-periodic antenna 102; FIG. simply shows the radio waves 106 which will be reflected by the conical reflector 104, but FIG. does not show the radio waves 106 which are transmitted upwards by the log-periodic antenna 102.

Moreover, with the arrangement of the conical reflector 104, the radio waves 106 reflected by the conical reflector 104 will be directed to the top of the log-periodic antenna 102, so that the radio waves 106 reflected by the conical reflector 104 will be combined with the radio waves 106 originally transmitted upwards by the log-periodic antenna 102, thereby concentrating the energy of the radio waves 106. The log-periodic antenna 102 is completely arranged outside the conical reflector 104. An upper bottom surface 130 of the conical reflector 104 is parallel to the log-periodic antenna 102 (which is manufactured on a printed circuit board, such as a printed circuit board 108 shown in FIG. 6); the upper bottom surface 130 of the conical reflector 104 is closer to the log-periodic antenna 102 than a lower bottom surface 132 of the conical reflector 104.

Figure 1:
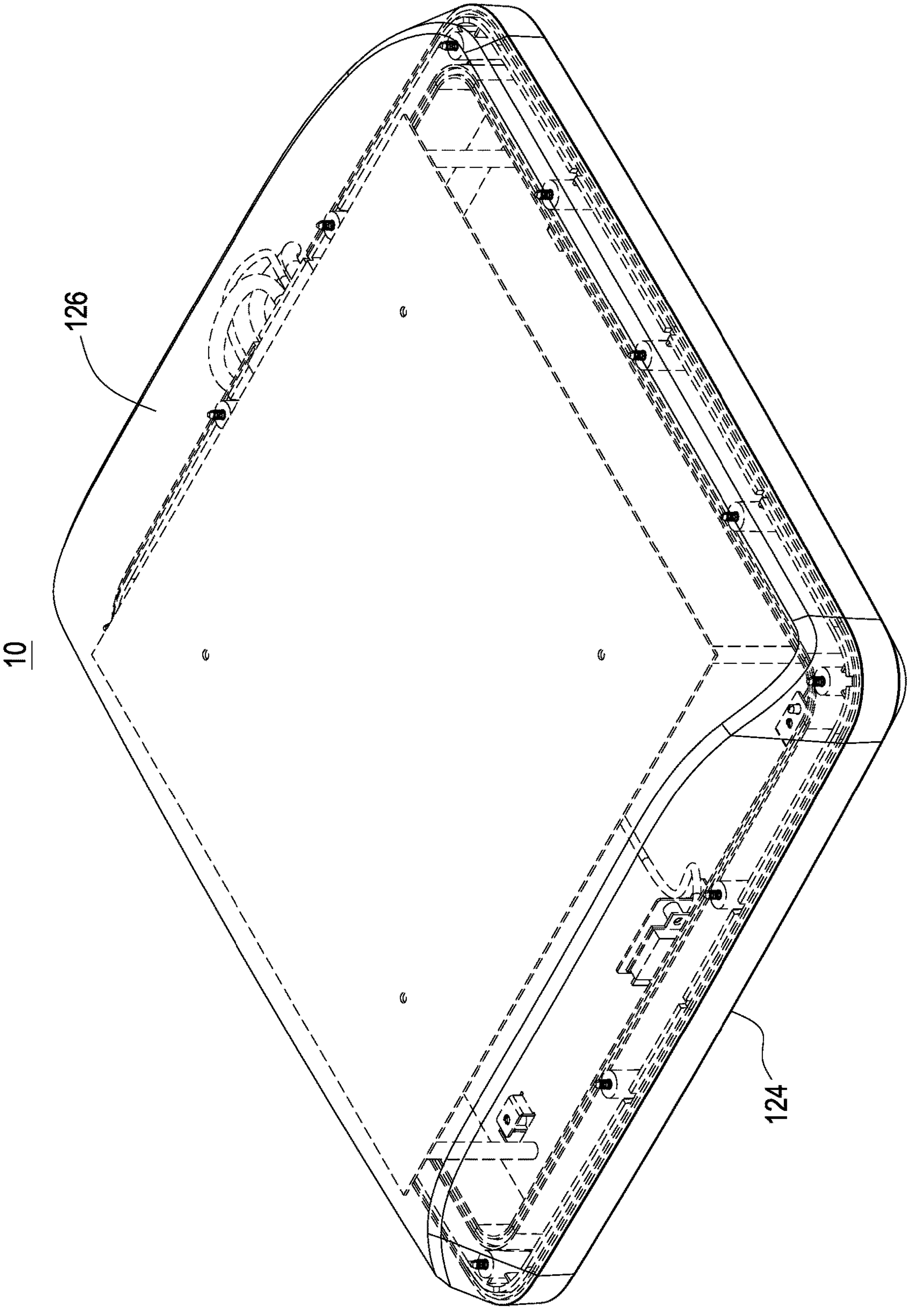
FIG. 1 shows a combined appearance diagram of the embodiment of the dual polarization log-periodic antenna apparatus of the present disclosure.
Figure 2:
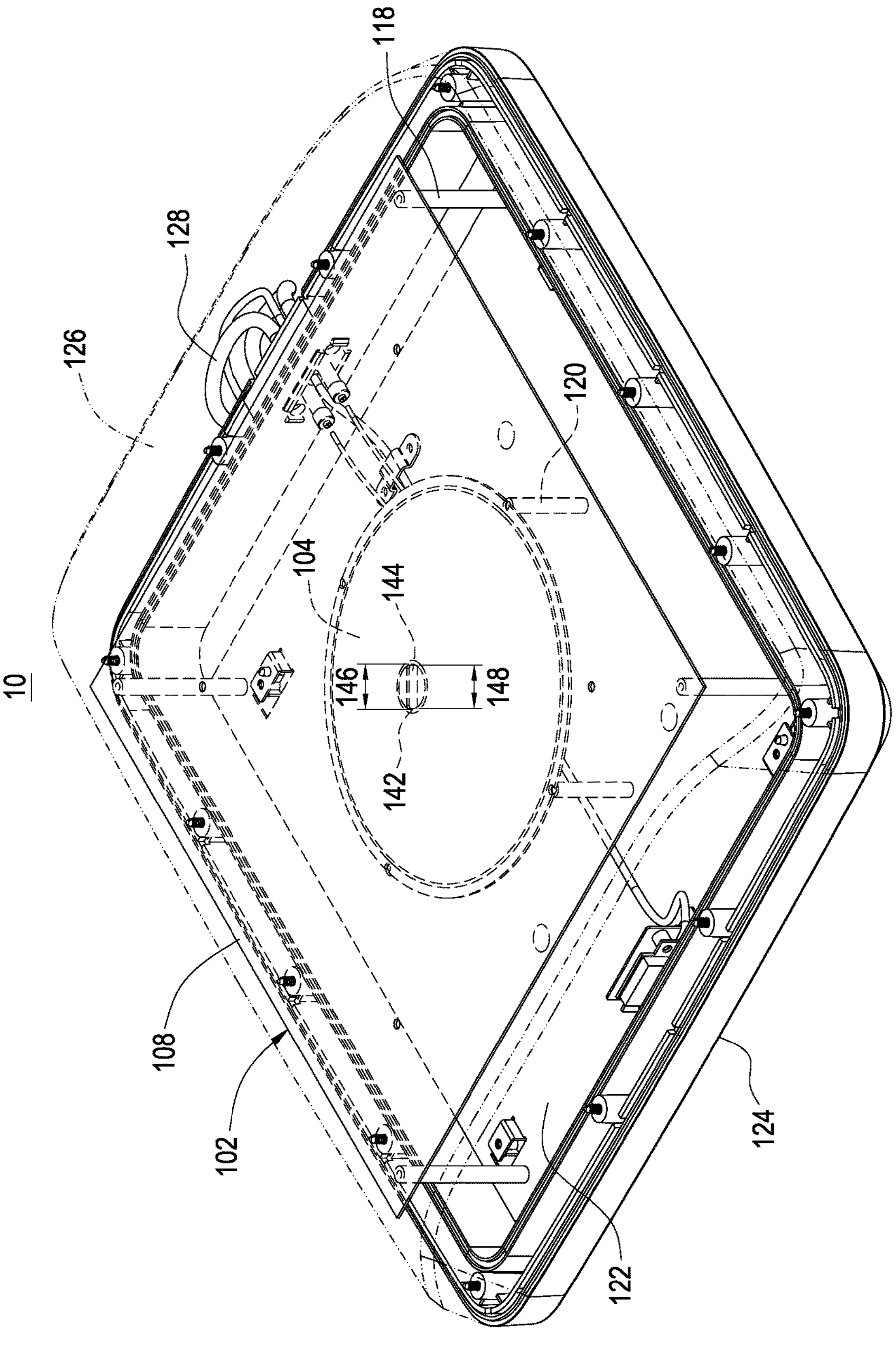
FIG. 2 shows a perspective view from an angle of the embodiment of the dual polarization log-periodic antenna apparatus of the present disclosure.
Figure 3:
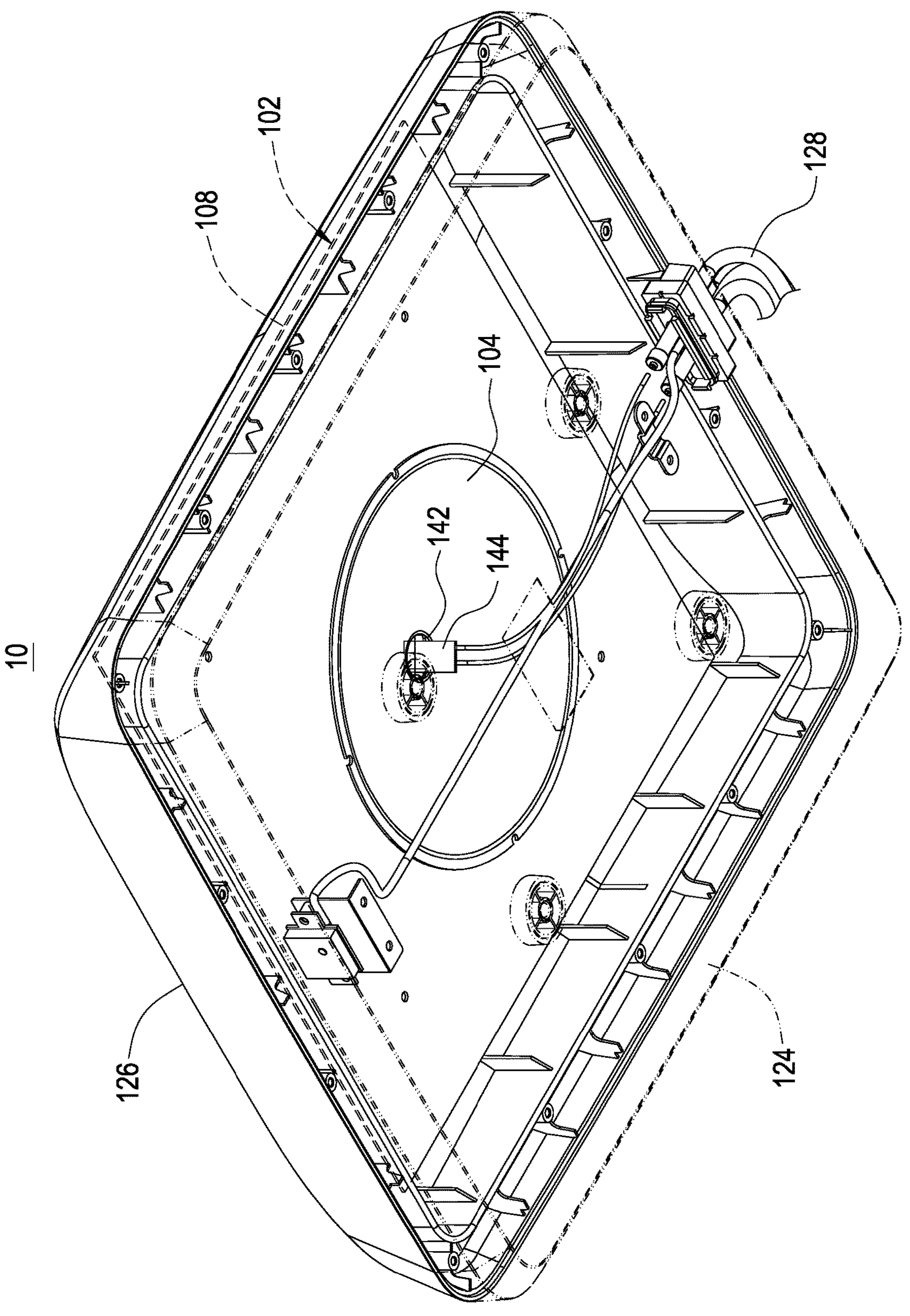
FIG. 3 shows a perspective view from another angle of the embodiment of the dual polarization log-periodic antenna apparatus of the present disclosure.
Figure 4:
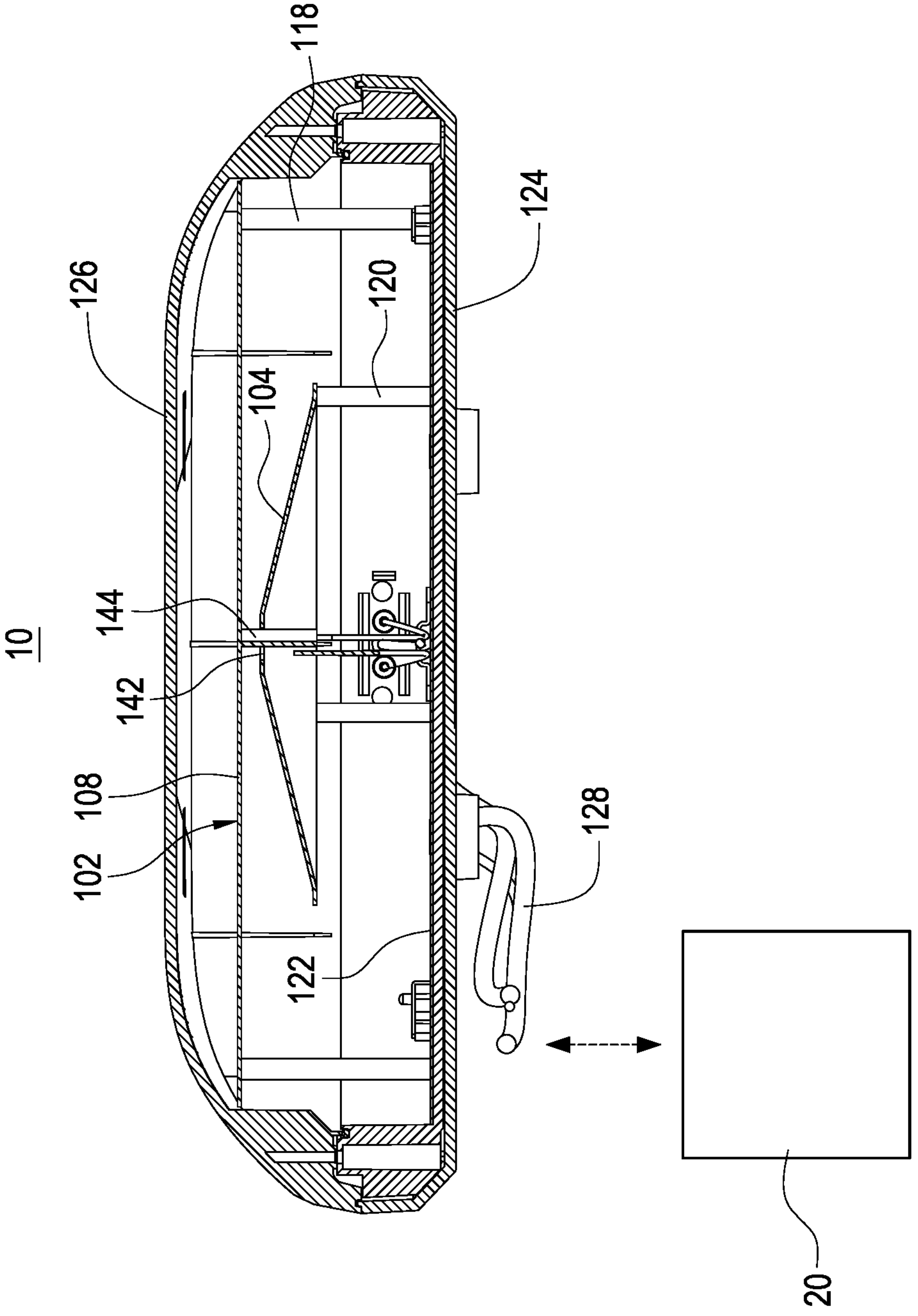
FIG. 4 shows a side cross-sectional view of the embodiment of the dual polarization log-periodic antenna apparatus of the present disclosure.

FIG. 1 shows a combined appearance diagram of the embodiment of the dual polarization log-periodic antenna apparatus 10 of the present disclosure; the solid lines of FIG. 1 represent the appearance of the dual polarization log-periodic antenna apparatus 10 while the dashed lines represent the internal components of the dual polarization log-periodic antenna apparatus 10. FIG. 2 shows a perspective view from an angle of the embodiment of the dual polarization log-periodic antenna apparatus 10 of the present disclosure; FIG. 2 is a top-down view of the dual polarization log-periodic antenna apparatus 10. FIG. 3 shows a perspective view from another angle of the embodiment of the dual polarization log-periodic antenna apparatus 10 of the present disclosure; FIG. 3 is a bottom-up view of the dual polarization log-periodic antenna apparatus 10. FIG. 4 shows a side cross-sectional view of the embodiment of the dual polarization log-periodic antenna apparatus 10 of the present disclosure. Please refer to FIG. 1, FIG. 2, FIG. 3 and FIG. 4 at the same time.

The conical reflector 104 is, for example but not limited to, a circular truncated cone or a circular cone. As shown in these figures, the conical reflector 104 is a circular truncated cone, but the conical reflector 104 being the circular cone can also achieve the effect of the present disclosure. The conical reflector 104 is made of a metal; the metal is, for example but not limited to, an aluminum. The dual polarization log-periodic antenna apparatus 10 is applied to a host. The dual polarization log-periodic antenna apparatus 10 further includes a plurality (for example, four) of first support columns 118, a plurality (for example, four) of second support columns 120, a metal reflection plate 122, a lower housing 124, an upper housing 126 and a plurality of coaxial cables 128. The log-periodic antenna 102 includes a printed circuit board 108. Moreover, the conical reflector 104 is, for example but not limited to, hollow. The printed circuit board 108 is, for example but not limited to, square.

The conical reflector 104 is arranged below the printed circuit board 108. The first support columns 118 are connected to the printed circuit board 108. The second support columns 120 are connected to the conical reflector 104. The metal reflection plate 122 is connected to the first support columns 118 and the second support columns 120. The metal reflection plate 122 is arranged below the conical reflector 104. The conical reflector 104 is arranged between the printed circuit board 108 and the metal reflection plate 122. The metal reflection plate 122 is arranged on the lower housing 124. The upper housing 126 is assembled to the lower housing 124 to accommodate the log-periodic antenna 102, the conical reflector 104, the first support columns 118, the second support columns 120 and the metal reflection plate 122. The coaxial cables 128 are electrically connected to the log-periodic antenna 102 and the host 20.

Figure 6:
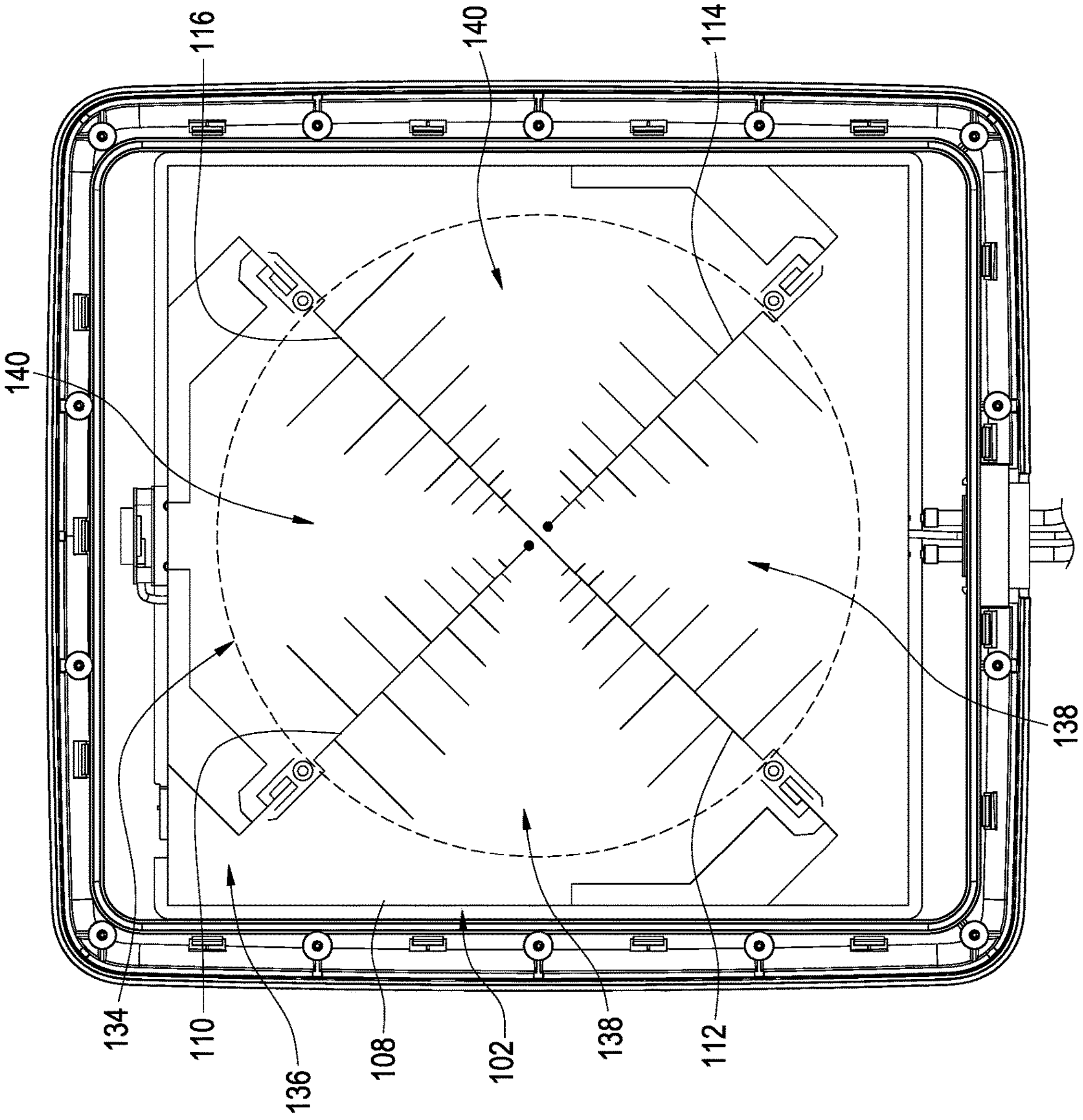
FIG. 6 shows a top view of the embodiment of the log-periodic antenna of the present disclosure.

FIG. 6 shows a top view of the embodiment of the log-periodic antenna 102 of the present disclosure. In addition to the printed circuit board 108, the log-periodic antenna 102 further includes a first planar log-periodic antenna structure 110, a second planar log-periodic antenna structure 112, a third planar log-periodic antenna structure 114 and a fourth planar log-periodic antenna structure 116. The first planar log-periodic antenna structure 110 is formed on the printed circuit board 108. The second planar log-periodic antenna structure 112 is formed on the printed circuit board 108. The third planar log-periodic antenna structure 114 is formed on the printed circuit board 108 and electrically connected to the first planar log-periodic antenna structure 110. The fourth planar log-periodic antenna structure 116 is formed on the printed circuit board 108 and electrically connected to the second planar log-periodic antenna structure 112. In other words, the log-periodic antenna 102 is a planar log-periodic antenna.

Moreover, please refer to FIG. 6 again. The log-periodic antenna 102 is configured to divide a high frequency region 134 and a low frequency region 136 on the printed circuit board 108. The low frequency region 136 is configured to surround the high frequency region 134. The high frequency region 134 includes the first planar log-periodic antenna structure 110, the second planar log-periodic antenna structure 112, the third planar log-periodic antenna structure 114 and the fourth planar log-periodic antenna structure 116. A low frequency applied to the low frequency region 136 is, for example but not limited to, 617 MHz-960 MHz. A high frequency applied to the high frequency region 134 is, for example but not limited to, 1500 MHz-5925 MHz.

Moreover, please refer to FIG. 6 again. The log-periodic antenna 102 is configured to further define that the high frequency region 134 includes a first high frequency sub-region 138 and a second high frequency sub-region 140. The first high frequency sub-region 138 includes one half of the first planar log-periodic antenna structure 110, the second planar log-periodic antenna structure 112 and one half of the third planar log-periodic antenna structure 114. The second high frequency sub-region 140 includes the other half of the first planar log-periodic antenna structure 110, the fourth planar log-periodic antenna structure 116 and the other half of the third planar log-periodic antenna structure 114.

Moreover, the radiation pattern of the related art log-periodic antenna points to the front of the stack. Please refer to FIG. 6 again; the log-periodic antenna 102 of the present disclosure is configured to combine the first planar log-periodic antenna structure 110 and the third planar log-periodic antenna structure 114 to form a polarization direction array antenna, and to combine the second planar log-periodic antenna structure 112 and the fourth planar log-periodic antenna structure 116 to form an orthogonal polarization direction array antenna, to achieve a higher gain value.

Moreover, because the metal reflection plate for the related art log-periodic antenna is flat, which is different from the conical reflector 104 (shown in FIG. 2) of the present disclosure, the related art log-periodic antenna can only concentrate/form the low frequency energy but cannot concentrate/form the high frequency energy; this is because the flat metal reflection plate for the related art log-periodic antenna is farther from the related art log-periodic antenna. In the present disclosure, in different frequency bands, because the antenna lengths are different, the distance between the log-periodic antenna 102 and the reflection surface of the conical reflector 104 also needs to be changed accordingly (using the conical reflection surface) to form a single main wave; however, the metal reflection plate for the related art log-periodic antenna is flat, the radiation pattern of the related art log-periodic antenna cannot be changed accordingly; the high frequency energy of the related art log-periodic antenna cannot be concentrated/formed as a single main wave.

Figure 7:
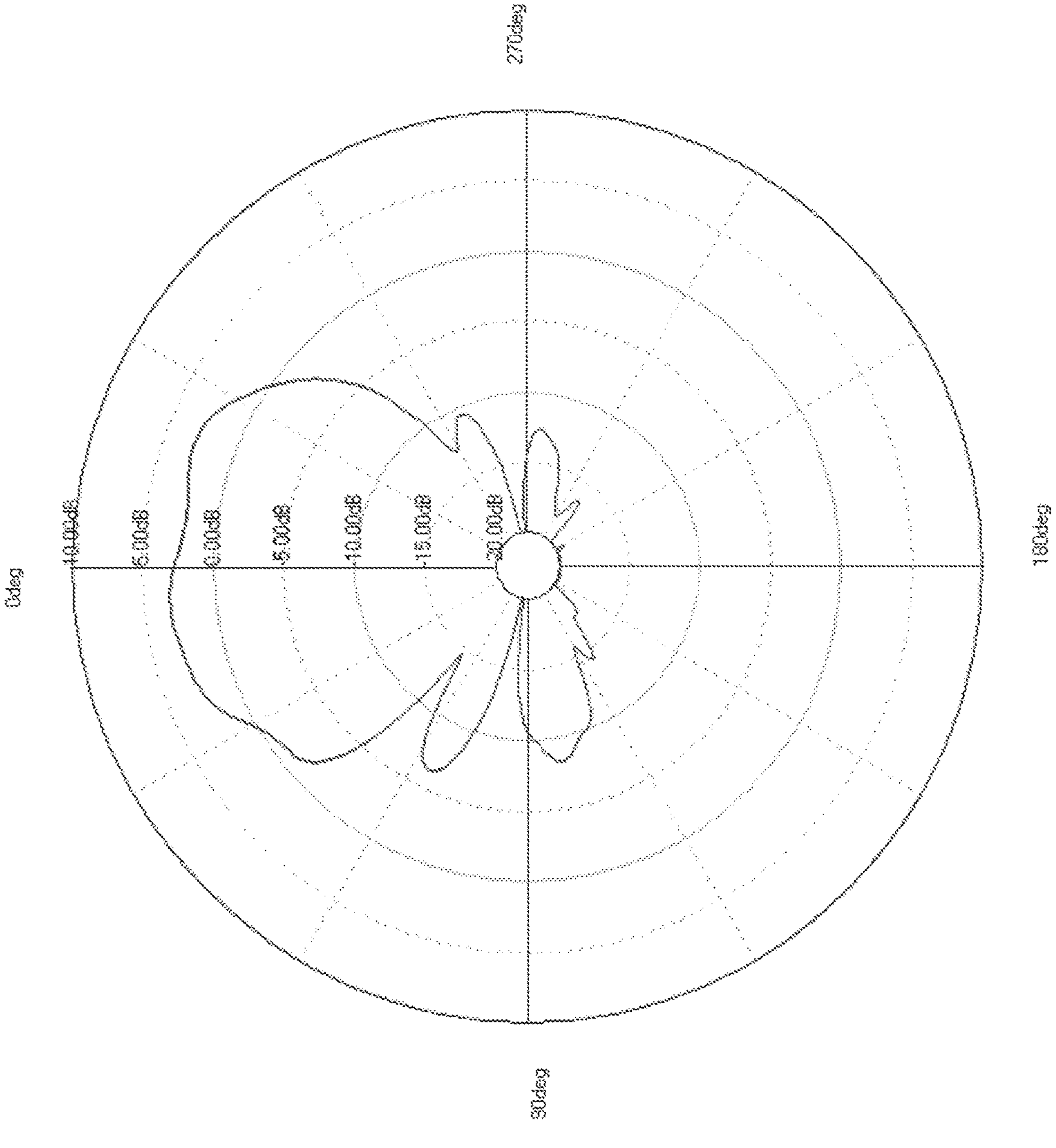
FIG. 7 shows a radiation pattern diagram (at the frequency of 5850 MHz) in the horizontal direction of the embodiment of the dual polarization log-periodic antenna apparatus of the present disclosure.
Figure 8:
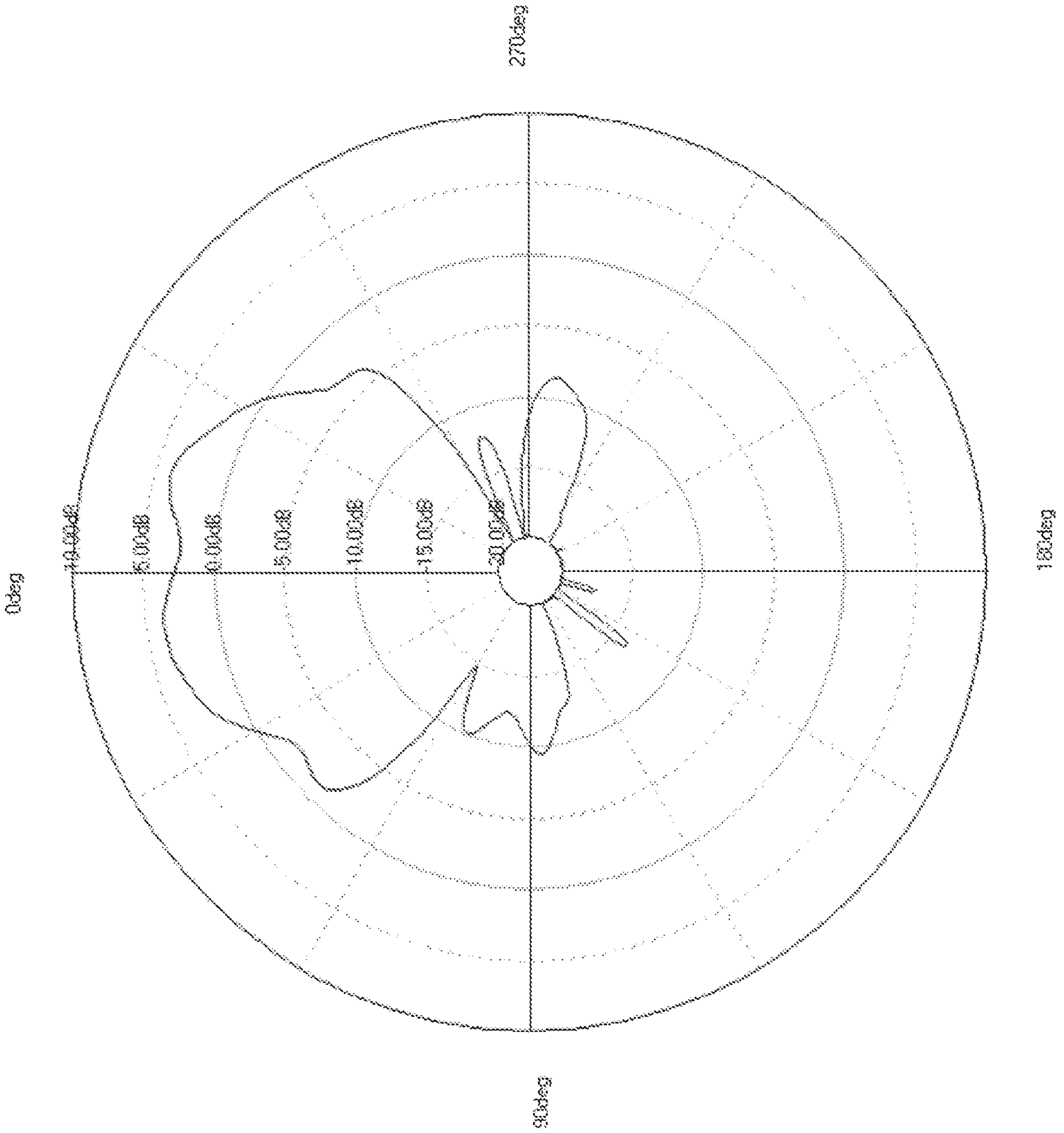
FIG. 8 shows a radiation pattern diagram (at the frequency of 5850 MHz) in the vertical direction of the embodiment of the dual polarization log-periodic antenna apparatus of the present disclosure.
Figure 9:
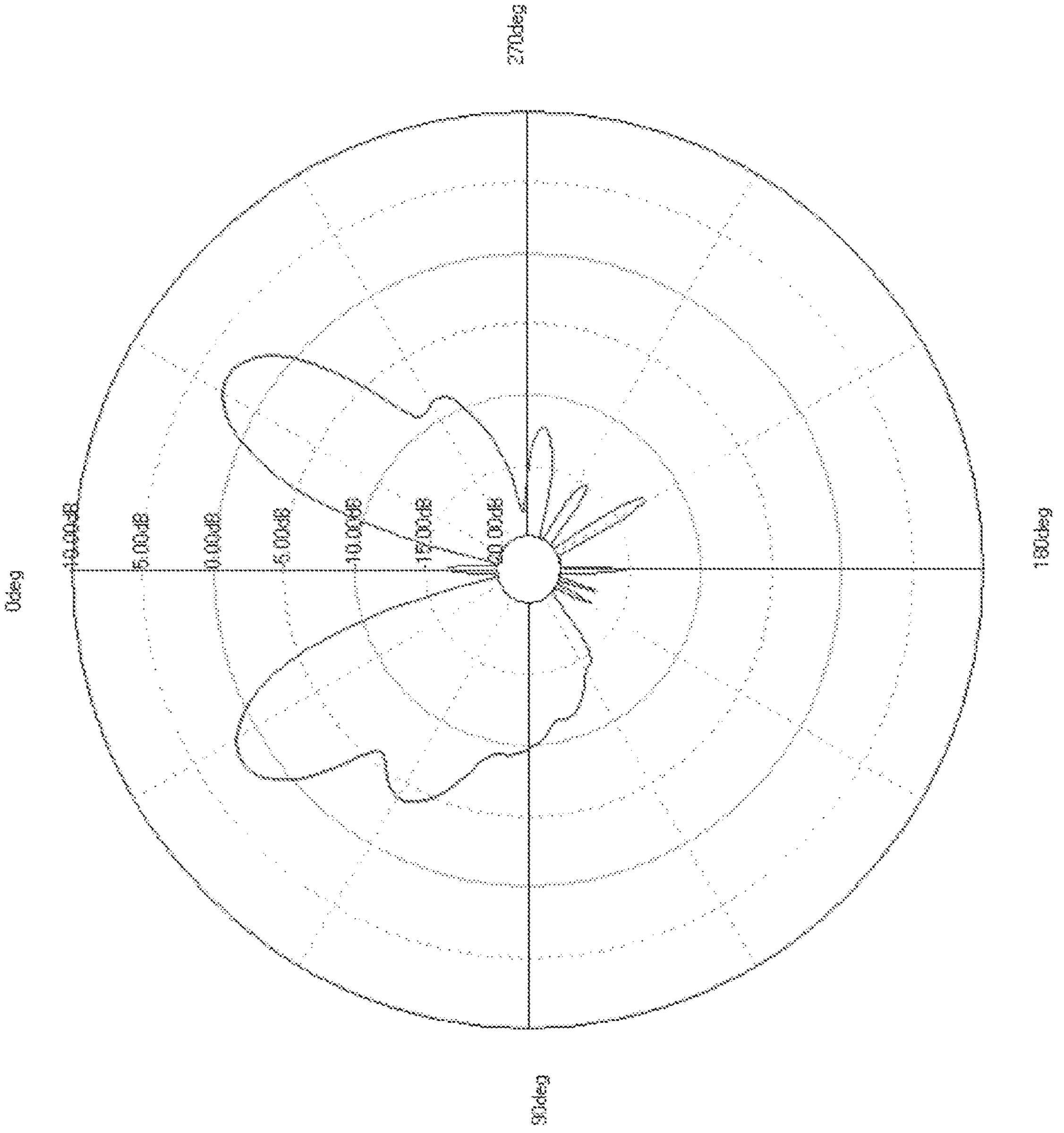
FIG.9 Related Art
FIG. 9 shows a radiation pattern diagram (at the frequency of 5850 MHz) in the horizontal direction of the example of the related art log-periodic antenna (without the conical reflection surface).
Figure 10:
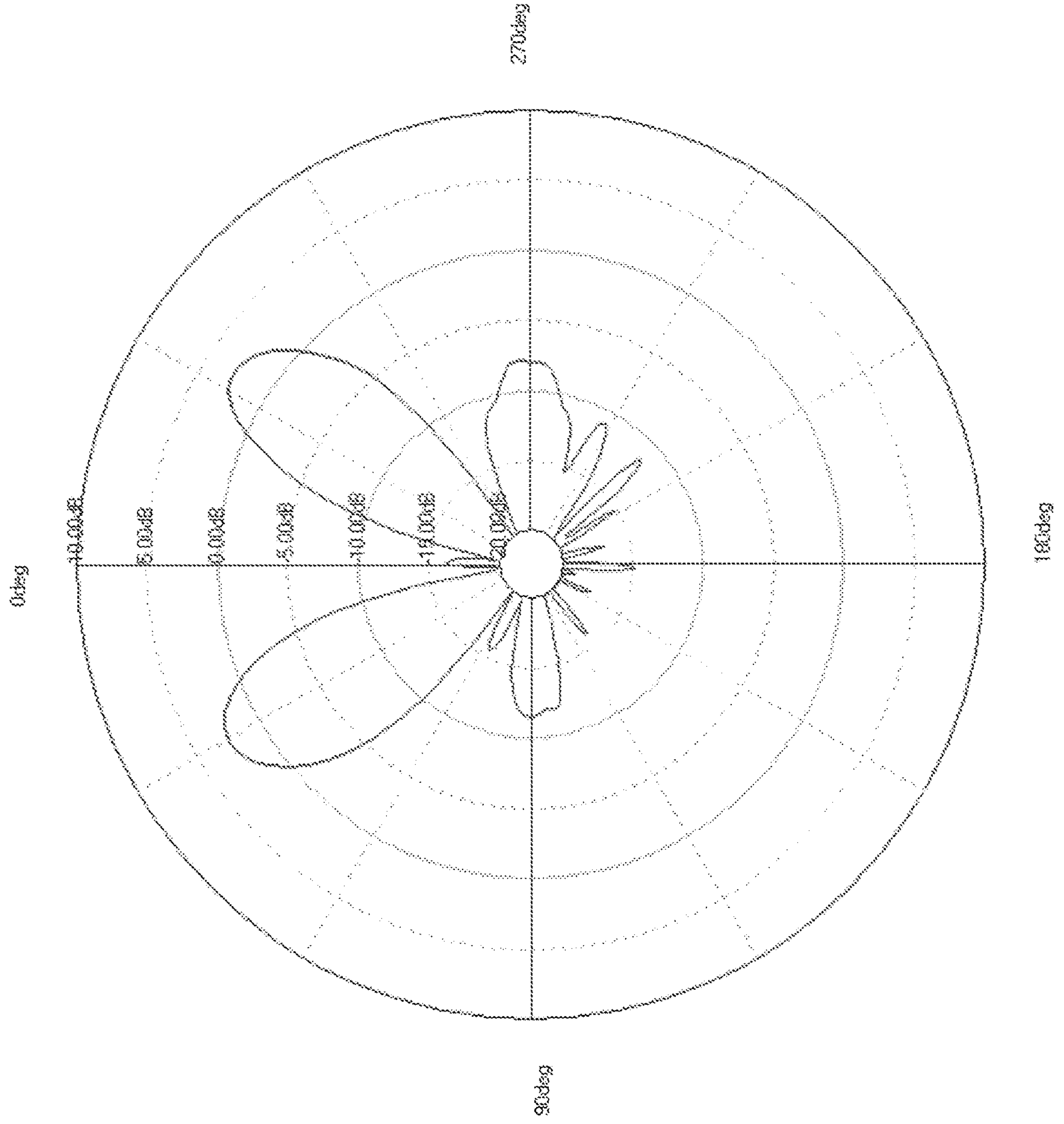
FIG.10 Related Art
FIG. 10 shows a radiation pattern diagram (at the frequency of 5850 MHz) in the vertical direction of the example of the related art log-periodic antenna (without the conical reflection surface).

Moreover, the high frequency energy of the log-periodic antenna 102 of the present disclosure can be combined, and can be reflected by the conical reflector 104 to be transmitted forward to form as a single main wave. The dual polarization log-periodic antenna apparatus 10 of the present disclosure is a broadband (1500 MHz-5925 MHz) directional antenna. FIG. 7 shows a radiation pattern diagram (at the frequency of 5850 MHz) in the horizontal direction of the embodiment of the dual polarization log-periodic antenna apparatus 10 of the present disclosure. FIG. 8 shows a radiation pattern diagram (at the frequency of 5850 MHz) in the vertical direction of the embodiment of the dual polarization log-periodic antenna apparatus 10 of the present disclosure. FIG. 9 shows a radiation pattern diagram (at the frequency of 5850 MHz) in the horizontal direction of the example of the related art log-periodic antenna (without the conical reflection surface). FIG. shows a radiation pattern diagram (at the frequency of 5850 MHz) in the vertical direction of the example of the related art log-periodic antenna (without the conical reflection surface). 0 deg shown in FIG. 7 to FIG. 10 represents 0 degree; 90 deg represents 90 degrees; 180 deg represents 180 degrees; 270 deg represents 270 degrees. As shown in FIG. 7 and FIG. 8, the high frequency energy of the dual polarization log-periodic antenna apparatus 10 of the present disclosure can be combined. As shown in FIG. 9 and FIG. 10, the high frequency energy of the related art log-periodic antenna cannot be combined.

Moreover, please refer to FIG. 2, FIG. 3 and FIG. 4 again. The conical reflector 104 is configured to define a hole 142 (at the upper bottom surface 130 shown in FIG. 5). The log-periodic antenna 102 further includes a jumper plate 144. The jumper plate 144 is arranged on the lower side of the printed circuit board 108 through the hole 142. The third planar log-periodic antenna structure 114 is electrically connected to the first planar log-periodic antenna structure 110 through the jumper plate 144. The function of the jumper plate 144 is to prevent signals of a first antenna group (for example, the first planar log-periodic antenna structure 110 plus the third planar log-periodic antenna structure 114) from being mixed into signals of a second antenna group (for example, the second planar log-periodic antenna structure 112 plus the fourth planar log-periodic antenna structure 116). If the first antenna group is regarded as a positive electrode and the second antenna group is regarded as a negative electrode, the jumper plate 144 can prevent the first antenna group and the second antenna group from forming a short circuit between the positive electrode and the negative electrode. Moreover, a diameter 146 of the hole 142 is equal to a length 148 of the jumper plate 144; namely, the hole 142 is formed/made as small as possible to prevent high frequency radio waves from passing through the hole 142.

The advantage of the present disclosure is to change the radiation direction of the dual polarization log-periodic antenna through the conical reflector.

Although the present disclosure has been described with reference to the embodiment thereof, it will be understood that the disclosure is not limited to the details thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. A dual polarization log-periodic antenna apparatus comprising:

a log-periodic antenna; and a conical reflector arranged below the log-periodic antenna, wherein the log-periodic antenna is configured to transmit a plurality of radio waves;

the conical reflector is configured to reflect the radio waves transmitted by the log-periodic antenna, wherein the log-periodic antenna comprises:

a printed circuit board, the conical reflector arranged below the printed circuit board;

a first planar log-periodic antenna structure formed on the printed circuit board;

a second planar log-periodic antenna structure formed on the printed circuit board;

a third planar log-periodic antenna structure formed on the printed circuit board and electrically connected to the first planar log-periodic antenna structure; and a fourth planar log-periodic antenna structure formed on the printed circuit board and electrically connected to the second planar log-periodic antenna structure.

2. The dual polarization log-periodic antenna apparatus of claim 1, wherein the conical reflector is a circular truncated cone.

3. The dual polarization log-periodic antenna apparatus of claim 2, wherein the conical reflector is made of a metal.

4. The dual polarization log-periodic antenna apparatus of claim 3, wherein the metal is an aluminum.

5. The dual polarization log-periodic antenna apparatus of claim 1, wherein the conical reflector is a circular cone.

6. The dual polarization log-periodic antenna apparatus of claim 1, further comprising:

a plurality of first support columns connected to the printed circuit board; and a plurality of second support columns connected to the conical reflector.

7. The dual polarization log-periodic antenna apparatus of claim 6, further comprising:

a metal reflection plate connected to the first support columns and the second support columns, wherein the metal reflection plate is arranged below the conical reflector; the conical reflector is arranged between the printed circuit board and the metal reflection plate.

8. The dual polarization log-periodic antenna apparatus of claim 7, further comprising:

a lower housing, the metal reflection plate arranged on the lower housing; and an upper housing assembled to the lower housing to accommodate the log-periodic antenna, the conical reflector, the first support columns, the second support columns and the metal reflection plate.

9. The dual polarization log-periodic antenna apparatus of claim 8, applied to a host and further comprising:

a plurality of coaxial cables electrically connected to the log-periodic antenna and the host.

* * * * *